(12) United States Patent
Robinson et al.

(10) Patent No.: US 10,353,831 B2
(45) Date of Patent: Jul. 16, 2019

(54) TRUSTED LAUNCH OF SECURE ENCLAVES IN VIRTUALIZED ENVIRONMENTS

(71) Applicant: Intel Corporation, Santa Clara, CA (US)

(72) Inventors: Scott H. Robinson, Portland, OR (US); Ravi L. Sahita, Beaverton, OR (US); Mark W. Shanahan, Raleigh, NC (US); Karanvir S. Grewal, Hillsboro, OR (US); Nitin V. Sarangdhar, Portland, OR (US); Carlos V. Rozas, Portland, OR (US); Bo Zhang, Raleigh, NC (US); Shanwei Cen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 14/998,065

(22) Filed: Dec. 24, 2015

(65) Prior Publication Data
US 2017/0185776 A1 Jun. 29, 2017

(51) Int. Cl.
G06F 12/00 (2006.01)
G06F 12/14 (2006.01)
G06F 9/455 (2018.01)
G06F 21/57 (2013.01)

(52) U.S. Cl.
CPC ........ *G06F 12/145* (2013.01); *G06F 9/45558* (2013.01); *G06F 21/575* (2013.01); *G06F 2009/45579* (2013.01); *G06F 2009/45583* (2013.01); *G06F 2009/45587* (2013.01);
(Continued)

(58) Field of Classification Search
None
See application file for complete search history.

(56) References Cited

U.S. PATENT DOCUMENTS

| 2002/0169938 | A1* | 11/2002 | Scott ................... G06F 12/1072 711/207 |
| 2006/0010440 | A1* | 1/2006 | Anderson ........... G06F 9/45533 718/1 |
| 2007/0234412 | A1 | 10/2007 | Smith et al. |

(Continued)

FOREIGN PATENT DOCUMENTS

EP 2482220 A1 8/2012

OTHER PUBLICATIONS

Jonathan Edwards et al., "Protecting Sensor Data From Malware Attacks", Intel Technology Journal, 2014, p. 178-197, vol. 18 issue 4, Intel Corporation.
(Continued)

*Primary Examiner* — David Yi
*Assistant Examiner* — Craig S Goldschmidt
(74) *Attorney, Agent, or Firm* — Jordan IP Law, LLC (57) ABSTRACT

Systems, apparatuses and methods may provide for verifying, from outside a trusted computing base of a computing system, an identity an enclave instance prior to the enclave instance being launched in the trusted computing base, determining a memory location of the enclave instance and confirming that the memory location is local to the computing system. In one example, the enclave instance is a proxy enclave instance, wherein communications are conducted with one or more additional enclave instances in the trusted computing base via the proxy enclave instance and an unencrypted channel.

20 Claims, 6 Drawing Sheets

(52) U.S. Cl.
CPC .............. *G06F 2009/45591* (2013.01); *G06F 2221/034* (2013.01)

(56) References Cited

U.S. PATENT DOCUMENTS

| | | | |
|---|---|---|---|
| 2011/0088043 A1* | 4/2011 | Lind ................. | G06F 8/315 719/316 |
| 2012/0159184 A1 | 6/2012 | Johnson et al. | |
| 2014/0006776 A1 | 1/2014 | Scott-Nash et al. | |
| 2015/0186680 A1 | 7/2015 | Johnson et al. | |
| 2015/0278528 A1* | 10/2015 | Xing ................. | G06F 21/60 726/26 |

OTHER PUBLICATIONS

David Durham, "Mitigating Exploits, Rootkits, and Advanced Persistent Threats" (video), Hot Chips 26, Aug. 10, 2014, <https://www.youtube.com/watch?v=r7eO7y5lu70-#t=8274>, 2 pages.

Mihai Dontu et al., "Zero-Footprint Guest Memory Introspection from Xen", Xen Project Developer Summit 14, Aug. 18, 2014, 37 pages, Intel Corporation.

International Search Report and Written Opinion for International Patent Application No. PCT/US2016/063301, dated Mar. 2, 2017, 15 pages.

International Preliminary Report on Patentability for International Patent Application No. PCT/US2016/063301, dated Jul. 5, 2018, 12 pages.

\* cited by examiner

TRUSTED LAUNCH OF SECURE ENCLAVES IN VIRTUALIZED ENVIRONMENTS

TECHNICAL FIELD

Embodiments generally relate to data security. More particularly, embodiments relate to the trusted launch of secure enclaves in virtualized environments.

BACKGROUND

In computing systems, a trusted execution environment (TEE) may be implemented as a secure enclave that runs inside a dedicated trusted computing base (TCB), wherein the secure enclave may receive and operate on sensitive information. Virtualized computing architectures may include one or more virtual machines that are managed by a virtual machine monitor (VMM, e.g., hypervisor). In a virtualized enclave-based computing system, both the VMM and the operating system (OS) of a given virtual machine (VM) may operate outside the trusted computing base of a particular enclave (although the VMM may run inside a different TCB from the TCB of the secure enclave). Accordingly, there may be a risk of malware using the VMM and OS components to create an enclave launch sequence that enables the malware to misrepresent the memory location of the enclave, capture and/or manipulate sensitive information delivered to the enclave, pass false information to other secure enclaves, and so forth.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
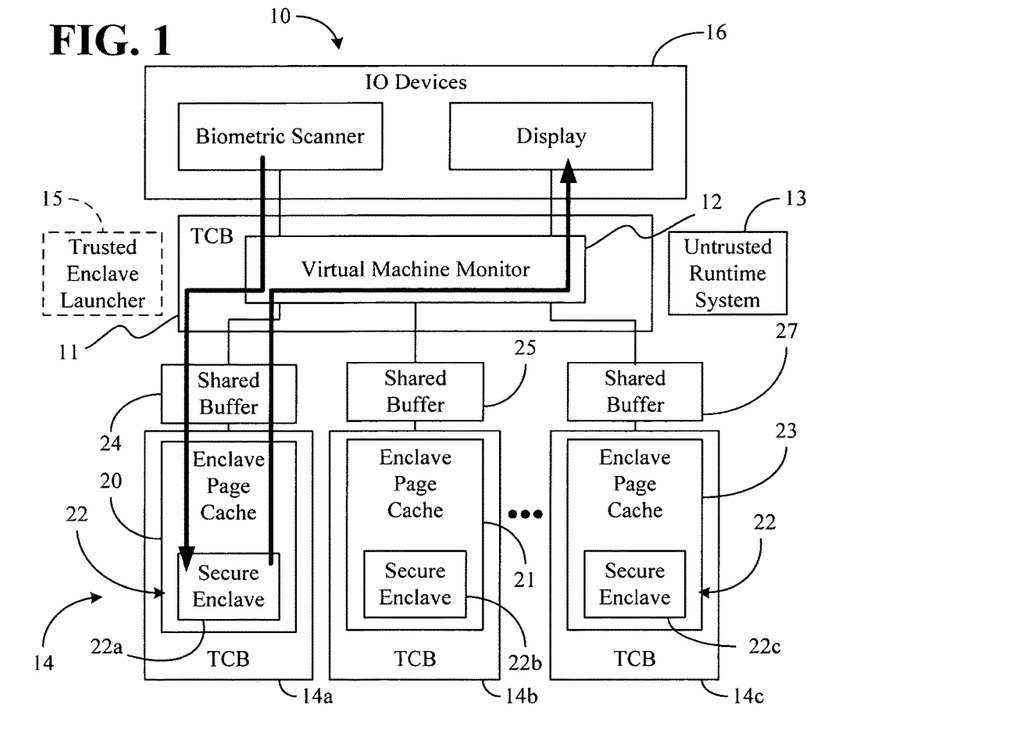
FIG. 1 is a block diagram of an example of a virtualized enclave-based computing system.

Turning now to FIG. 1 a virtualized enclave-based computing system 10 is shown. The system 10 may be part of, for example, a server, desktop computer, notebook computer, tablet computer, convertible tablet, smart phone, personal digital assistant (PDA), wearable device, mobile Internet device (MID), media player, etc., or any combination thereof. In the illustrated example, a virtual machine monitor (VMM) 12 runs in a trusted computing base (TCB) 11 and is communicatively coupled to one or more enclave TCBs 14 (14a-14c), one or more input output (IO) devices 16 (e.g., a human interface device/HID such as a biometric scanner, a display such as an organic light emitting diode/OLED display, liquid crystal display/LCD, touchscreen). Each enclave TCB 14 may generally include a set of runtime components (e.g., processors, registers, etc.) that enable at least a portion of the system 10 to be considered trustable. For example, if any of the components in the boot/launch process change (or get updated) after the trust is established, the enclave TCBs 14 may support a migration or re-sealing of secrets.

Each enclave TCB 14 may be communicatively coupled to a shared buffer that is visible to or accessible by the VMM 12, OS and/or launcher, and wherein the enclave TCB may include a relatively small enclave page cache (EPC) that is generally not visible to or accessible by the VMM 12. For example, a first enclave TCB 14a includes a first shared buffer 24 and a first EPC 20, a second enclave TCB 14b includes a second shared buffer 25 and a second EPC 21, a third enclave TCB 14c includes a third shared buffer 27 and a third enclave EPC 23, and so forth, in the illustrated example.

Thus, the first shared buffer 24 of the first enclave TCB 14a might be generally visible to and accessible by the VMM 12 and a first enclave instance 22a. Accordingly, the VMM 12 may use the first shared buffer 24 to communicate with the first enclave instance 22a. More particularly, the VMM 12 may use the first shared buffer 24 as an unencrypted channel to transfer sensitive data between the IO devices 16 and the secure enclave instances 22. As will be discussed in greater detail, access to the first shared buffer 24 may be through an extended page table (EPT, not shown) that is controlled by the VMM 12 and visible only to the VMM 12 and the first enclave instances 22a. Accordingly, the first shared buffer 24 may be considered to be within the TCB 11 of the VMM 12.

Thus, the IO devices 16 might include a biometric scanner that generates sensitive data such as, for example, fingerprint data and one of the secure enclave instances 22 may perform various processing and/or matching operations on the fingerprint data. In such a case, the display 18 might output (e.g., visually present) the results of the processing/matching operations or other information associated with the data. The illustrated system 10 may experience enhanced steady state performance and reduced protocol complexity because data transfers through the shared buffers 24, 25, 27 may be unencrypted. In one example, the secure enclave instances 22 are INTEL Software Guard eXtensions (SGX) enclaves. Moreover, the VMM 12 may communicate sensitive data from the IO devices 16 to one or more additional enclave instances 22b-22c via the first enclave instance 22a, wherein the first enclave instance 22a functions as a proxy enclave instance.

As will be discussed in greater detail, the VMM 12 may verify the identity (e.g., cryptographic hash) of at least the first enclave instance 22a, determine the memory location in the EPC 20 of the first enclave instance 22a and confirm that the memory location is local to the computing system 10. Of particular note is that instead of verifying the identity of the first enclave instance 22a after the first enclave instance 22a is launched, the illustrated VMM 12 verifies the identity of the first enclave instance 22a before the first enclave instance 22a is launched. Moreover, the VMM 12 may use one or more of an untrusted runtime system (URTS, e.g., an operating system/OS component) 13 or a trusted enclave launcher 15 to launch at least the first enclave instance 22a in a secure fashion even though the URTS 13 and/or the trusted enclave launcher 15 may operate outside the first enclave TCB 14a of the first enclave instance 22a. As a result, the illustrated solution reduces the risk of malware (e.g., local or remote) creating an enclave launch sequence that enables the malware to misrepresent the memory location of the first enclave instance 22a, capture and/or manipulate sensitive information delivered to the first enclave instance 22a, pass false information to the additional enclave instances 22b-22c, and so forth.

Figure 2:
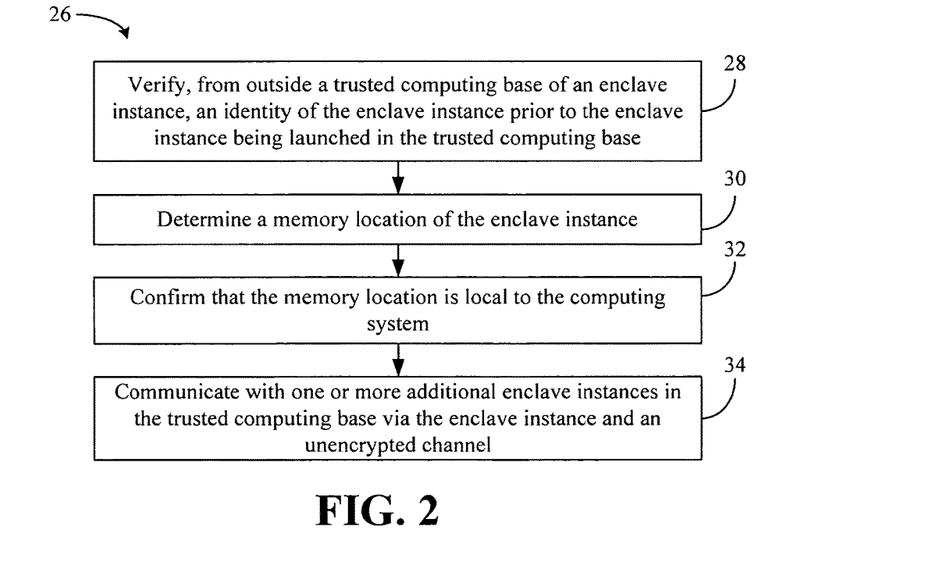
FIG. 2 is a flowchart of an example of a method of operating a virtual machine monitor apparatus according to an embodiment.

FIG. 2 shows a method 26 of operating a virtual machine monitor apparatus. The method 26 may generally be implemented in a computing system such as, for example, the virtualized enclave-based computing system 10 (FIG. 1), already discussed. More particularly, the method 26 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 26 may be written in any combination of one or more programming languages, including an object oriented programming language such as JAVA, SMALLTALK, C++ or the like and conventional procedural programming languages, such as the "C" programming language or similar programming languages.

Illustrated processing block 28 provides for verifying, from outside a trusted computing base of an enclave instance, an identity (e.g., cryptographic hash) of the enclave instance prior to the enclave instance being launched in the trusted computing base. Block 30 may determine a memory location of the enclave instance, wherein illustrated block 32 confirms that the memory location is local to the computing system. In one example, block 34 communicates with one or more additional enclave instances in the trusted computing base via the enclave instance and an unencrypted channel (e.g., the enclave instance functions as a proxy). The method 26 may use a URTS and/or a trusted enclave launcher to securely launch the enclave instances.

Figure 3:
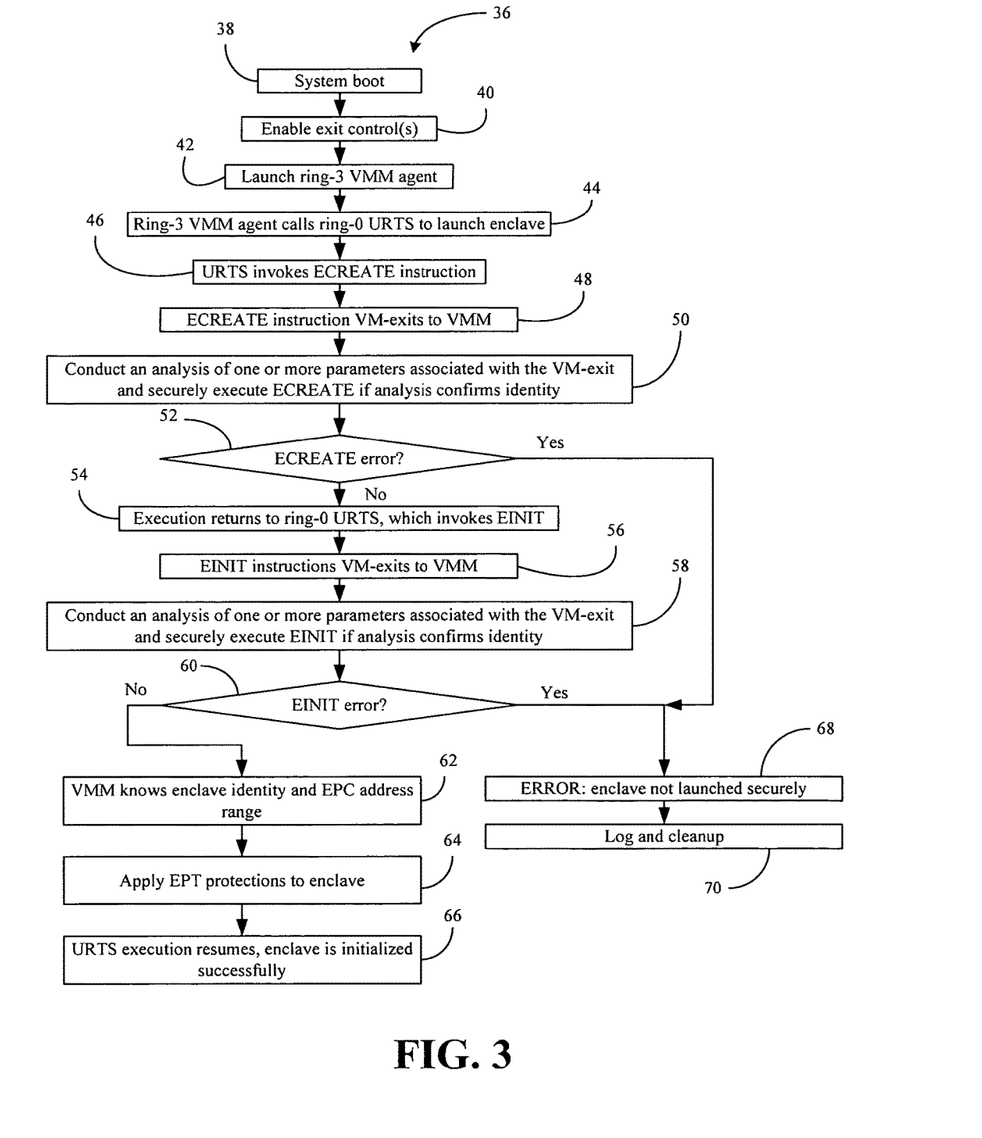
FIG. 3 is a flowchart of an example of a method of launching secure enclaves via an untrusted runtime system according to an embodiment.

FIG. 3 shows a method 36 of launching secure enclaves via a URTS. The method 36 may generally be implemented in a computing system such as, for example, the virtualized enclave-based computing system 10 (FIG. 1), already discussed. More particularly, the method 36 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In the illustrated example, a system boot occurs at block 38. Block 38 may include the startup of a VMM, VM and/or a hardware-based security framework such as SGX. One or more exit controls may be enabled in a VM at block 40, wherein the exit controls might include an enclave creation (e.g., ECREATE) VM-exit command, an enclave initialization (e.g., EINIT) VM-exit command, and so forth. The exit controls may be considered "traps" to the extent that execution of the underlying launch instructions (e.g., ECREATE, EINIT) within the VM automatically triggers a transfer of control (e.g., an "exit") from the VM to the VMM. A ring-3 VMM agent may be launched at block 42. In this regard, the computing system may include various privilege rings, with applications residing at the relatively unprivileged "ring-3" protection level (e.g., lacking system level privileges), the operating system (OS) residing at the "ring-0" protection level (e.g., having some system level privileges), and the VMM residing beneath the ring-0 protection level (e.g., having full system level privileges). From the perspective of the enclave instance, the agent launched at block 42 may be considered an untrusted application that accompanies the enclave instance (e.g., an SGX enclave may not trust anything other than itself).

In block 44, the ring-3 VMM agent may call the ring-0 URTS to launch an enclave instance, which may be stored in non-volatile memory (NVM) such as, for example, a solid state disk (SSD). The URTS may invoke the ECREATE launch instruction at block 46, which triggers the execution of an exit control at block 48, in the illustrated example. During block 46, the URTS may allocate EPC pages and assemble other information for the enclave instance being launched. In this regard, the ECREATE launch instruction may not inherently receive or generate enclave identity information (e.g., MRENCLAVE) or sealing authority public key information (e.g., MRSIGNER) that would otherwise enable the VMM to determine which enclave instance is being launched. Accordingly, block 46 may also involve adding one or more annotations (e.g., tags) to the ECREATE launch instruction in order to track the particular ECREATE launch instruction. In another example, a tracking data structure such as, for example, a list, database, etc., may be used to track all launch instructions.

Illustrated block 50 conducts an analysis of one or more parameters associated with the execution of the exit control (e.g., copying structures of interest to a VMM-secure area that is not accessible by the normal OS so that they are immutable) and securely executes the ECREATE launch instruction if the analysis confirms the identity (e.g., cryptographic hash) of the enclave instance. Block 50 may include removing one or more annotations from the ECREATE launch instruction. Moreover, block 50 may capture relevant information such as, for example, an SECS (SGX enclave control structure) address in the EPC, enclave range, and so forth. The VMM may rely on the security framework hardware to perform other checks of the ECREATE instruction after completion of the method 36. A determination may be made at block 52 as to whether an error has occurred (e.g., based on various exit conditions of the ECREATE instruction). If an error has not occurred, block 54 may return execution to the ring-0 URTS, which invokes the EINIT instruction, in the illustrated example.

The EINIT instruction may trigger the execution of another exit control at block 56. Illustrated block 58 conducts an analysis of one or more parameters associated with the execution of the exit control (e.g., copying structures of interest to a secure area) and securely executes the EINIT launch instruction if the analysis confirms the identity of the enclave instance. The effective address of the SECS address from the ECREATE launch instruction may be correlated with the EINIT launch instruction to obtain the MRSIGNER/MRENCLAVE information. More particularly, the MRENCLAVE information may uniquely identify the enclave instance and may be compared against a VMM-stored value to verify the identity of the enclave. Block 58 may also check other attributes such as whether the enclave instance is debuggable, wherein an inability to debug the enclave instance may be grounds for disqualification. If the SECS address does not match, the EINIT launch instruction may be permitted to proceed normally on the basis that a match was not found to the ECREATE launch instruction of interest. If a tracking data structure (e.g., a list, database, etc.), is being used to track all launch instructions, block 58 may include searching the tracking data structure to determine whether the EINIT launch instruction corresponds to the ECREATE launch instruction of interest.

A determination may be made at block 60 as to whether an error has occurred. If not, since the VMM is aware of the enclave identity and EPC address range at block 62, illustrated block 64 applies EPT protections to the enclave instance by, for example, "wrapping" the enclave instance in an EPT-protected view and confirming locality prior to transferring sensitive data to the enclave instance. The URTS execution may resume at illustrated block 66. If either an ECREATE error or an EINIT error is detected, block 68 may generate an appropriate error message, wherein logging of the error and cleanup of system files may be conducted at block 70.

Figure 4:
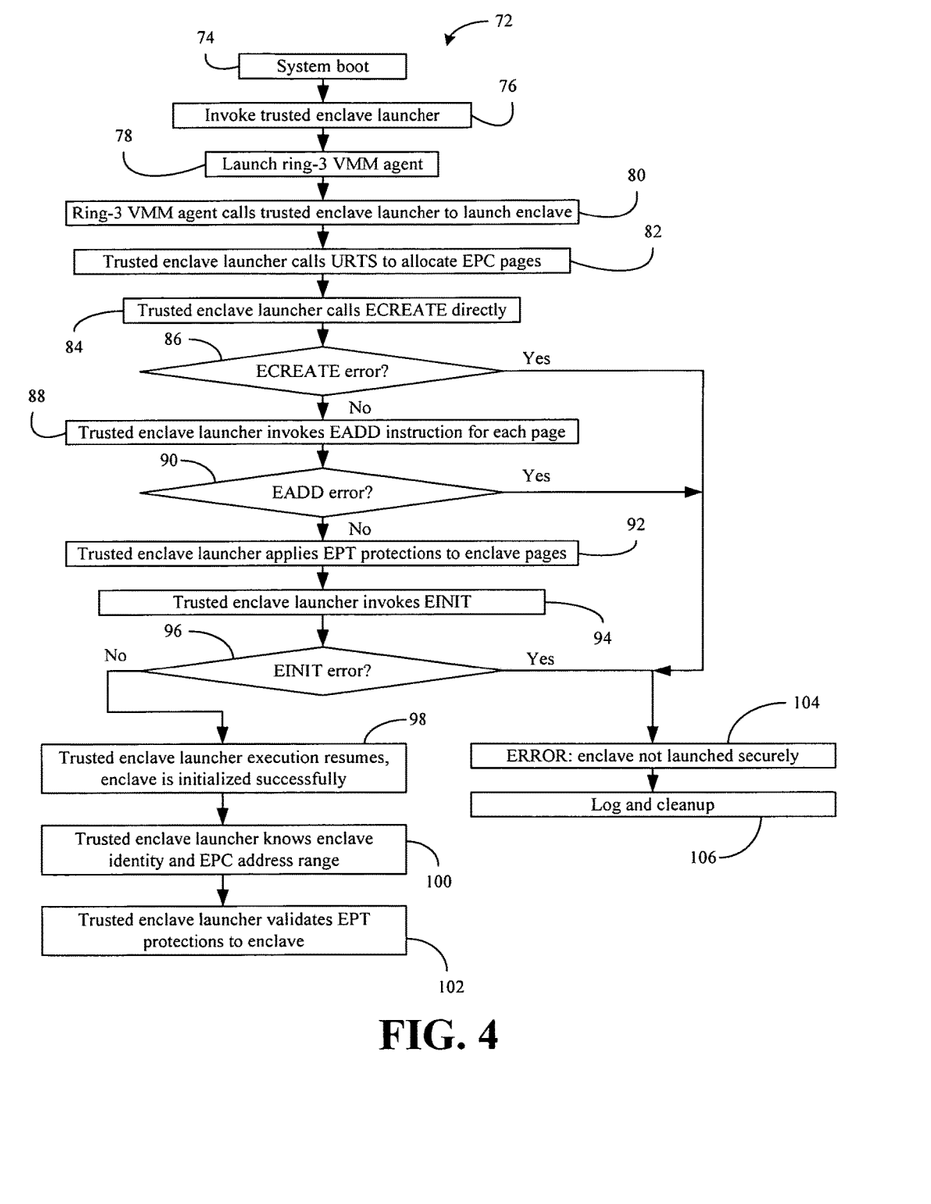
FIG. 4 is a flowchart of an example of a method of launching secure enclaves via a trusted enclave launcher according to an embodiment.

FIG. 4 shows another approach in which a method 72 launches secure enclaves via a trusted enclave launcher. The method 72 may generally be implemented in a computing system such as, for example, the virtualized enclave-based computing system 10 (FIG. 1), already discussed. More particularly, the method 72 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 74 conducts a system boot, which may include a startup of a VMM, VM and/or a hardware-based security framework such as SGX. A trusted enclave launcher (e.g., a VMM-trusted runtime systemN-TRTS) may be invoked at block 76. Block 76 may include, for example, loading SGX URTS and VTRTS drivers and adding the VTRTS drivers to a VMM-protected domain. A ring-3 VMM agent may be launched at block 78, wherein the ring-3 VMM agent may call the trusted enclave launcher at block 80 to launch the enclave instance. The trusted enclave launcher may in turn call the URTS at block 82 to allocate EPC pages from memory. The trusted enclave launcher calls the ECREATE launch instruction directly at illustrated block 84. A determination may be made at block 86 as to whether an error has occurred (e.g., based on various exit conditions of the ECREATE instruction).

If an ECREATE error has not occurred, the trusted enclave launcher may invoke an EADD launch instruction for each allocated EPC page at block 88. In this regard, pages of data/code may generally be loaded into the enclave memory space through the EADD launch instruction. For example, each EADD load instruction might load a page (e.g., 4096 bytes) of code/data into the enclave instance. Block 88 may also provide for the use of EEXTEND launch instructions to measure each page, although some pages may not be measured. The EEXTEND launch instruction may hash, for example, 256 bytes of data into a MRENCLAVE measurement. It may be unlikely that the correct MRENCLAVE measurement, which is verified by the EINIT instruction, will be obtained unless the EADD/EEXTEND launch instructions are used on all data in the enclave instance in the correct manner (e.g., a convention between a tool that signs the enclave instance and the VTRTS/URTS loaders). The method 36 (FIG. 1), already discussed, may not show the use of EADD (and EEXTEND) launch instructions because the VMM may simply observe the load operations of the URTS via the exit controls (e.g., if the EINIT load instruction succeeds, then it may be inferred that the URTS performed all of the EADD and EEXTEND load instructions correctly because the MRENCLAVE measurement has been verified).

A determination may be made at block 90 as to whether an EADD error has occurred. If an EADD error has not occurred, the trusted enclave launcher applies EPT protections at block 92 to the EPC pages allocated to the enclave instance. Block 92 may generally ensure that the trusted enclave launcher temporarily is the only entity that is able to modify the EPC pages (e.g., though SGX instructions). Additionally, in illustrated block 94 the trusted enclave launcher invokes the EINIT launch instruction, wherein a determination may be made at block 96 as to whether an EINIT error has occurred.

If an EINIT error has not occurred, execution by the trusted enclave launcher may resume at block 98, wherein the trusted enclave launcher is aware of the enclave identity and EPC address range at block 100. Moreover, the trusted enclave launcher may validate EPT protections to the enclave instance at block 102. Block 102 may modify the EPT protections applied in block 92 to convert the enclave instance into a view that may be assigned specifically to an application.

After verifying that the EINIT launch instruction has succeeded (which may be conducted in order to execute code within the enclave instance), entry into the enclave instance may be conducted in a specific manner. For example, entry might involve the use of an EENTER instruction and a pointer to a special page within the enclave (a thread control structure/TCS page). It may be presumed that the TCS page is under control of the EPT view (e.g., accessible to the trusted enclave launcher) and has not been tampered with. Once the enclave instance has been entered, the security framework (e.g., SGX framework) may limit execution to only pages that were loaded via the EADD launch instruction to that enclave instance (e.g., the exact page makeup is known because the MRENCLAVE measurement was verified by the EINIT launch instruction). Malware might remove a page from an enclave instance protected under such an approach, but the malware would not be able to add the page back to the enclave instance. Additionally, EPTs may be used to prevent the removal of pages, but the security framework may already be providing confidentiality/integrity protection.

If an error is detected at blocks 86, 90 or 96, illustrated block 104 generates an error message. The logging of the error and cleanup of system files may be conducted at block 106.

Figure 5:
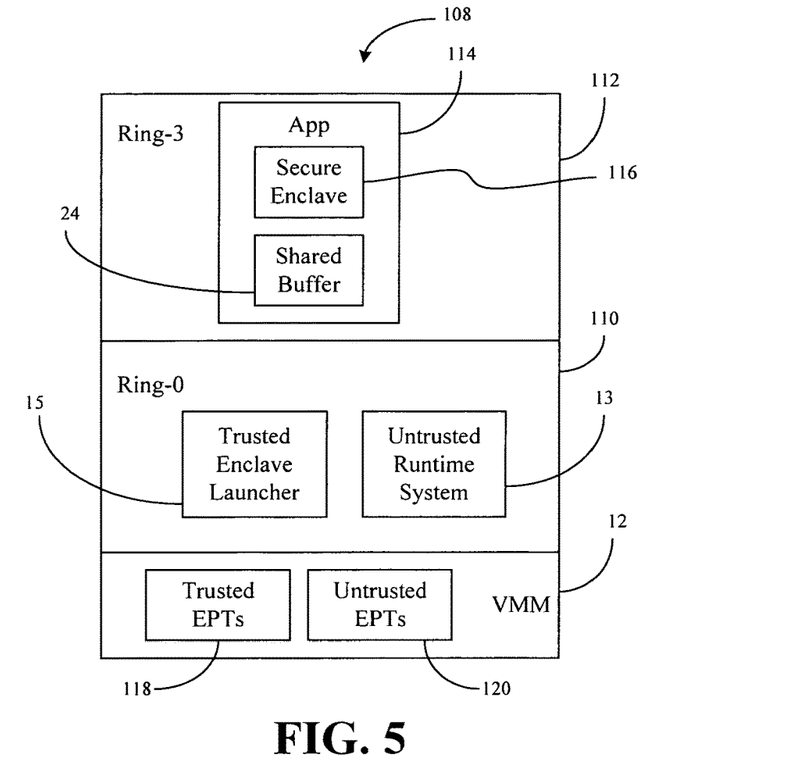
FIG. 5 is a block diagram of an example of a privilege stack according to an embodiment.

FIG. 5 shows a privilege stack 108 that may be used in conjunction with the method 72 (FIG. 4), already discussed. In general, a ring-3 layer 112 resides above a ring-0 layer 110, which resides above the VMM 12. The ring-3 layer 112 may include an application 114 having an enclave instance 116 that is stored in EPC memory and the shared buffer 24, which is stored in non-EPC memory. Both the enclave instance 116 and the shared buffer 24 may be considered trusted resources from the perspective of the enclave TCB in question. The illustrated ring-0 layer 110 includes the trusted enclave launcher 15 (e.g., VTRTS) and the URTS 13, wherein the trusted enclave launcher 15 may invoke EPC allocate and EPC free processes via the URTS 13. The trusted enclave launcher 15 and the URTS 13 may each be configured to call launch instructions such as, for example, EINIT, ECREATE, EADD, and so forth. The VMM 12 may include one or more trusted EPTs 118 and one or more untrusted EPTs 120. The trusted EPTs 118 may be used to create views of trusted components such as, for example, the enclave instance 116, the shared buffer 24 and/or the trusted enclave launcher 15.

Figure 6:
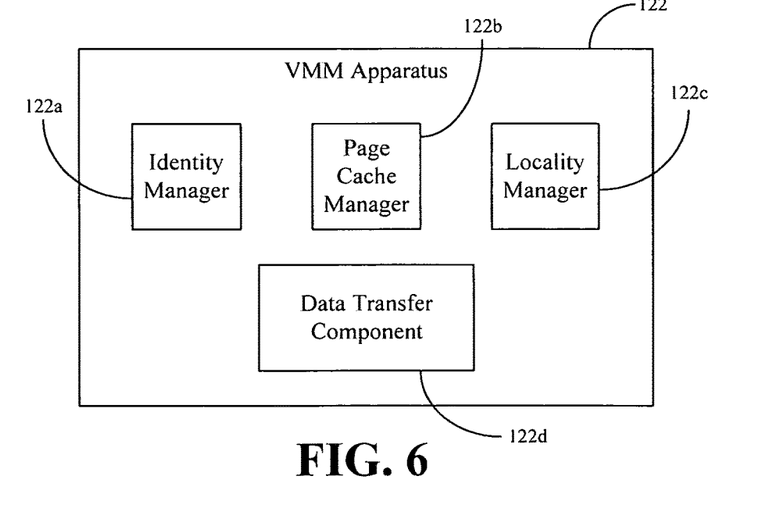
FIG. 6 is a block diagram of an example of a virtual machine monitor apparatus according to an embodiment.

Turning now to FIG. 6, a VMM apparatus 122 (122a-122d) is shown. The VMM apparatus 122, which may implement one or more aspects of the method 26 (FIG. 2), the method 36 (FIG. 3) and/or the method 72 (FIG. 4), already discussed, may be readily substituted for the VMM 12 (FIGS. 1 and 5), already discussed. In the illustrated example, an identity manager 122a may verify, from outside a trusted computing base of an enclave instance, an identity of the enclave instance prior to the enclave instance being launched in the trusted computing base. The apparatus 122 may also include a page cache manager 122b that determines a memory location of the enclave instance. Additionally, a locality manager 122c may confirm that the memory location is local to the computing system. In one example, the enclave instance is a proxy enclave instance and a data transfer component 122d communicates with one or more additional enclave instances in the trusted computing base via the proxy enclave instance and an unencrypted channel.

In an example such as the method 36 (FIG. 3), the identity manager 122a might enable one or more exit controls in a VM, trigger an execution of the exit control(s) via a URTS associated with the VM, conduct an analysis of one or more parameters associated with the execution of the exit control(s), and launch the enclave instance if the analysis confirms the identity of the enclave instance. In such a case, the memory location may be obtained from the URTS. Moreover, the identity manager 122a may track a plurality of launch instructions (e.g., ECREATE and EINIT) associated with the enclave instance based on one or more annotations to the plurality of launch instructions and remove the annotation(s) from the launch instruction(s). Alternatively, the identity manager 122a might track the plurality of launch instructions based on a tracking data structure (e.g., list, database).

In another example such as the method 72 (FIG. 4), the identity manager 122a may invoke a trusted enclave launcher and launch the enclave instance via the trusted enclave launcher. In such a case, the memory location may be obtained from the trusted enclave launcher.

Figure 7:
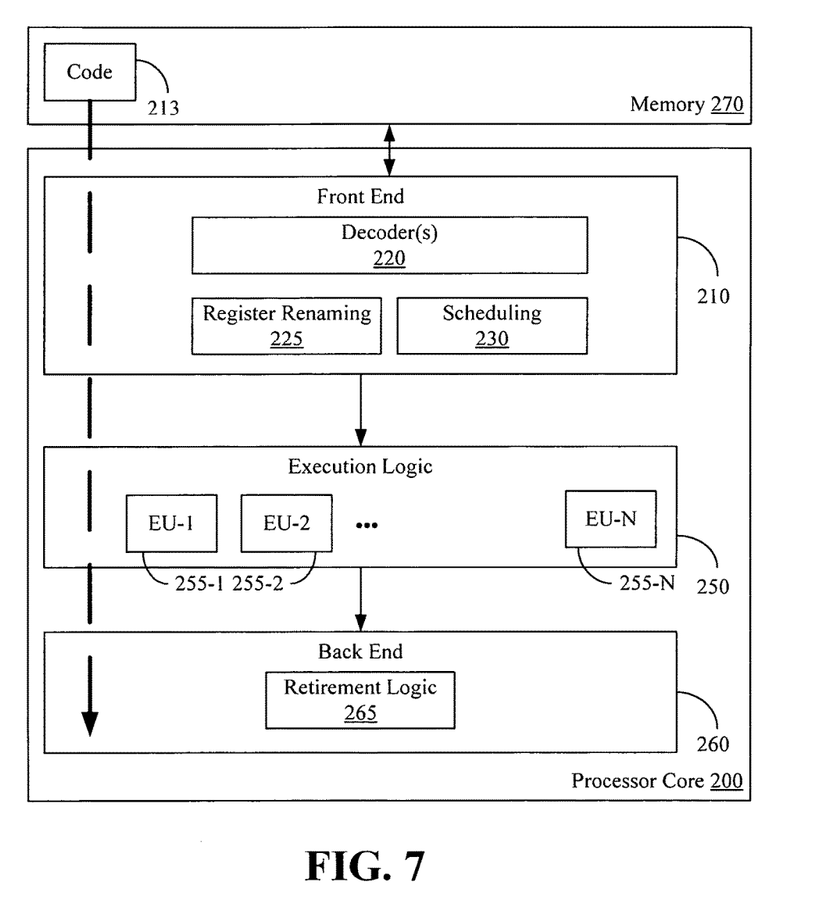
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 26 (FIG. 2), the method 36 (FIG. 3) and/or the method 72 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
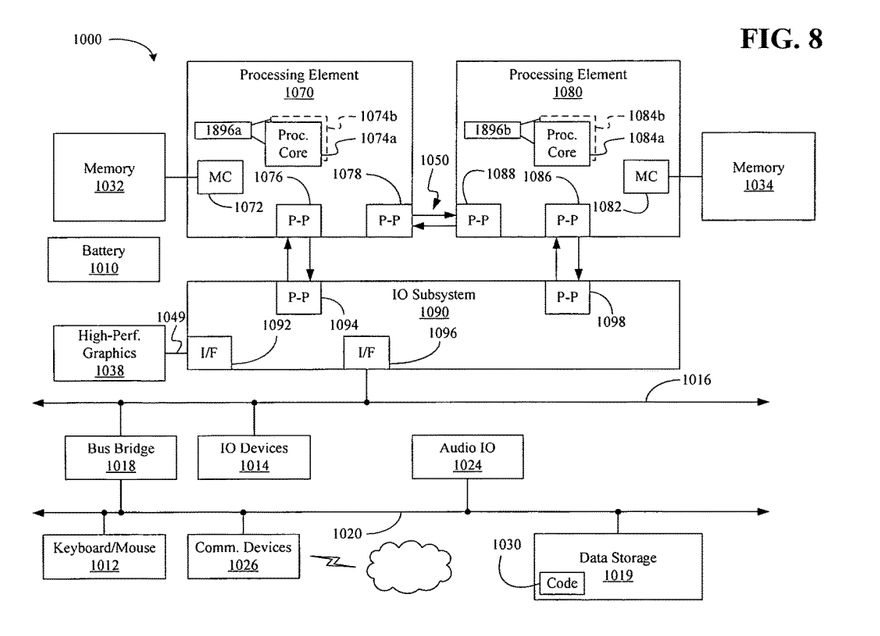
FIG. 8 is a block diagram of an example of a computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 26 (FIG. 2), the method 36 (FIG. 3) and/or the method 72 (FIG. 4), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a virtualized enclave-based computing system comprising an input output device to generate data, a display to visually present information associated with the data, a trusted computing base coupled to the display and the input output device, an enclave page cache (EPC) memory coupled to the trusted computing base, and a virtual machine monitor apparatus including an identity manager to verify, from outside the trusted computing base, an identity of an enclave instance prior to the enclave instance being launched in the trusted computing base, a page cache manager to determine a memory location of the enclave instance in the EPC memory, and a locality manager to confirm that the memory location is local to the computing system.

Example 2 may include the computing system of Example 1, further comprising an unencrypted channel that includes non-EPC buffer memory, wherein the enclave instance is a proxy enclave instance and the virtual machine monitor apparatus further includes a data transfer component to communicate the data to one or more additional enclave instances in the trusted computing base via the proxy enclave instance and the unencrypted channel.

Example 3 may include the computing system of Example 1, wherein the identity manager is to enable one or more exit controls in a virtual machine, trigger an execution of the one or more exit controls via an untrusted runtime system (URTS) associated with the virtual machine, conduct an analysis of one or more parameters associated with the execution of the one or more exit controls, and launch the enclave instance if the analysis confirms the identity of the enclave instance, wherein the memory location is to be obtained from the URTS.

Example 4 may include the computing system of Example 3, wherein the identity manager is to track a plurality of launch instructions associated with the enclave instance based on one or more annotations to the plurality of launch instructions and remove the one or more annotations from the plurality of launch instructions.

Example 5 may include the computing system of Example 3, wherein the identity manager is to track a plurality of launch instructions associated with the enclave instance based on a tracking data structure.

Example 6 may include the computing system of any one of Examples 1 or 2, wherein the identity manager is to invoke a trusted enclave launcher and launch the enclave instance via the trusted enclave launcher, and wherein the memory location is to be obtained from the trusted enclave launcher.

Example 7 may include a virtual machine monitor apparatus comprising an identity manager to verify, from outside a trusted computing base of an enclave instance, an identity of the enclave instance prior to the enclave instance being launched in the trusted computing base, a page cache manager to determine a memory location of the enclave instance, and a locality manager to confirm that the memory location is local to the computing system.

Example 8 may include the apparatus of Example 7, wherein the enclave instance is a proxy enclave instance and the apparatus further includes a data transfer component to communicate with one or more additional enclave instances in the trusted computing base via the proxy enclave instance and an unencrypted channel.

Example 9 may include the apparatus of Example 7, wherein the identity manager is to enable one or more exit controls in a virtual machine, trigger an execution of the one or more exit controls via an untrusted runtime system (URTS) associated with the virtual machine, conduct an analysis of one or more parameters associated with the execution of the one or more exit controls, and launch the enclave instance if the analysis confirms the identity of the enclave instance, wherein the memory location is to be obtained from the URTS.

Example 10 may include the apparatus of Example 9, wherein the identity manager is to track a plurality of launch instructions associated with the enclave instance based on one or more annotations to the plurality of launch instructions and remove the one or more annotations from the plurality of launch instructions.

Example 11 may include the apparatus of Example 9, wherein the identity manager is to track a plurality of launch instructions associated with the enclave instance based on a tracking data structure.

Example 12 may include the apparatus of any one of Examples 7 or 8, wherein the identity manager is to invoke a trusted enclave launcher and launch the enclave instance via the trusted enclave launcher, and wherein the memory location is to be obtained from the trusted enclave launcher.

Example 13 may include a method of operating a virtual machine monitor apparatus, comprising verifying, from outside a trusted computing base of an enclave instance, an identity of the enclave instance prior to the enclave instance being launched in the trusted computing base, determining a memory location of the enclave instance, and confirming that the memory location is local to the computing system.

Example 14 may include the method of Example 13, wherein the enclave instance is a proxy enclave instance and the method further includes communicating with one or more additional enclave instances in the trusted computing base via the proxy enclave instance and an unencrypted channel.

Example 15 may include the method of Example 13, further including enabling one or more exit controls in a virtual machine, triggering an execution of the one or more exit controls via an untrusted runtime system (URTS) associated with the virtual machine, conducting an analysis of one or more parameters associated with the execution of the one or more exit controls, and launching the enclave instance if the analysis confirms the identity of the enclave instance, wherein the memory location is obtained from the URTS.

Example 16 may include the method of Example 15, further including tracking a plurality of launch instructions associated with the enclave instance based on one or more annotations to the plurality of launch instructions, and removing the one or more annotations from the plurality of launch instructions.

Example 17 may include the method of Example 15, further including tracking a plurality of launch instructions associated with the enclave instance based on a tracking data structure.

Example 18 may include the method of any one of Examples 13 or 14, further including invoking a trusted enclave launcher, and launching the enclave instance via the trusted enclave launcher, wherein the memory location is obtained from the trusted enclave launcher.

Example 19 may include at least one computer readable storage medium comprising a set of instructions, which when executed by a computing system, cause the computing system to verify, from outside a trusted computing base of an enclave instance, an identity of the enclave instance prior to the enclave instance being launched in the trusted computing base, determine a memory location of the enclave instance, and confirm that the memory location is local to the computing system.

Example 20 may include the at least one computer readable storage medium of Example 19, wherein the enclave instance is a proxy enclave instance and the instructions, when executed, cause the computing system to communicate with one or more additional enclave instances in the trusted computing base via the proxy enclave instance and an unencrypted channel.

Example 21 may include the at least one computer readable storage medium of Example 19, wherein the instructions, when executed, cause the computing system to enable one or more exit controls in a virtual machine, trigger an execution of the one or more exit controls via an untrusted runtime system (URTS) associated with the virtual machine, conduct an analysis of one or more parameters associated with the execution of the one or more exit controls, and launch the enclave instance if the analysis confirms the identity of the enclave instance, wherein the memory location is to be obtained from the URTS.

Example 22 may include the at least one computer readable storage medium of Example 21, wherein the instructions, when executed, cause the computing system to track a plurality of launch instructions associated with the enclave instance based on one or more annotations to the plurality of launch instructions, and remove the one or more annotations from the plurality of launch instructions.

Example 23 may include the at least one computer readable storage medium of Example 21, wherein the instructions, when executed, cause the computing system to track a plurality of launch instructions associated with the enclave instance based on a tracking data structure.

Example 24 may include the at least one computer readable storage medium of any one of Examples 19 or 20, wherein the instructions, when executed, cause the computing system to invoke a trusted enclave launcher, and launch the enclave instance via the trusted enclave launcher, wherein the memory location is to be obtained from the trusted enclave launcher.

Example 25 may include a virtual machine monitor apparatus comprising means for verifying, from outside a trusted computing base of an enclave instance, an identity of the enclave instance prior to the enclave instance being launched in the trusted computing base, means for determining a memory location of the enclave instance, and means for confirming that the memory location is local to the computing system.

Example 26 may include the apparatus of Example 25, wherein the enclave instance is to be a proxy enclave instance and the apparatus further includes means for communicating with one or more additional enclave instances in the trusted computing base via the proxy enclave instance and an unencrypted channel.

Example 27 may include the apparatus of Example 25, further including means for enabling one or more exit controls in a virtual machine, triggering an execution of the one or more exit controls via an untrusted runtime system (URTS) associated with the virtual machine, means for conducting an analysis of one or more parameters associated with the execution of the one or more exit controls, and means for launching the enclave instance if the analysis confirms the identity of the enclave instance, wherein the memory location is obtained from the URTS.

Example 28 may include the apparatus of Example 27, further including means for tracking a plurality of launch instructions associated with the enclave instance based on one or more annotations to the plurality of launch instructions, and means for removing the one or more annotations from the plurality of launch instructions.

Example 29 may include the apparatus of Example 27, further including means for tracking a plurality of launch instructions associated with the enclave instance based on a tracking data structure.

Example 30 may include the apparatus of any one of Examples 25 or 26, further including means for invoking a trusted enclave launcher, and means for launching the enclave instance via the trusted enclave launcher, wherein the memory location is obtained from the trusted enclave launcher.

Thus, techniques described herein may enable a VMM to verify the identity (e.g., cryptographic hash) of an enclave before it is launched. The VMM may also be able to identify the EPC pages that the enclave occupies because the VMM controls page additions. Such an approach may enable the VMM to include those pages exactly in an EPT-protected view. There may also be scenarios where a malicious agent attempts to tear down parts of an enclave. Techniques described herein may prevent page unloads by virtualizing instructions. By verifying page loads and preventing page unloads before a view is created, the VMM may wrap the enclave in a view (e.g., an exclusive EPT). Accordingly, the VMM may securely launch the enclave, be aware of the enclave EPC range and ascertain an enclave identity (using the associated measurement).

In some instances, the enclave might evaluate the identity of the VMM (e.g., using trusted platform module/TPM measurements or other certificates). When the enclave trusts the identity, the enclave also may know that it has locality with respect to the VMM as trust makes locality a transitive property. The example of the method 36 (FIG. 3) may be more advantageous to a VMM vendor, but may involve the virtualization of launch instructions. The example of the method 72 (FIG. 4) may involve the use of VMM EPT protections for the trusted launch as well, but those protections may be exported using well-known techniques into ring-0.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
an input output device outside of a trusted computing base to generate data;
a display to visually present information associated with the data;
the trusted computing base coupled to the display and the input output device;
an enclave page cache (EPC) memory coupled to the trusted computing base; and
a virtual machine monitor apparatus including,
an identity manager to verify, from outside the trusted computing base, an identity of an enclave instance prior to the enclave instance being launched in the trusted computing base, wherein the enclave instance is a proxy enclave instance, a page cache manager to determine a memory location of the enclave instance in the EPC memory, a locality manager to confirm that the memory location is local to the computing system, and a data transfer component to communicate the data generated outside the trusted computing base to one or more additional enclave instances in the trusted computing base via the proxy enclave instance and an unencrypted channel, wherein the unencrypted channel includes non-EPC buffer memory that is to receive the data from the data transfer component and that is to provide the data to the proxy enclave instance that is to communicate the data to the one or more additional enclave instances.

2. The computing system of claim 1, wherein the identity manager is to enable one or more exit controls in a virtual machine, trigger an execution of the one or more exit controls via an untrusted runtime system (URTS) associated with the virtual machine, conduct an analysis of one or more parameters associated with the execution of the one or more exit controls, and launch the enclave instance if the analysis confirms the identity of the enclave instance, wherein the memory location is to be obtained from the URTS.

3. The computing system of claim 2, wherein the identity manager is to track a plurality of launch instructions associated with the enclave instance based on one or more annotations to the plurality of launch instructions and remove the one or more annotations from the plurality of launch instructions.

4. The computing system of claim 2, wherein the identity manager is to track a plurality of launch instructions associated with the enclave instance based on a tracking data structure.

5. The computing system of claim 1, wherein the identity manager is to invoke a trusted enclave launcher and launch the enclave instance via the trusted enclave launcher, and wherein the memory location is to be obtained from the trusted enclave launcher.

6. An apparatus comprising:

an identity manager to verify, from outside a trusted computing base of an enclave instance, an identity of the enclave instance prior to the enclave instance being launched in the trusted computing base, wherein the enclave instance is a proxy enclave instance;

a page cache manager to determine a memory location of the enclave instance;

a locality manager to confirm that the memory location is local to the computing system; and a data transfer component to communicate data generated outside the trusted computing base to one or more additional enclave instances in the trusted computing base via the proxy enclave instance and an unencrypted channel, wherein the unencrypted channel includes non-EPC buffer memory that is to receive the data from the data transfer component and that is to provide the data to the proxy enclave instance that is to communicate the data to the one or more additional enclave instances.

7. The apparatus of claim 6, wherein the identity manager is to enable one or more exit controls in a virtual machine, trigger an execution of the one or more exit controls via an untrusted runtime system (URTS) associated with the virtual machine, conduct an analysis of one or more parameters associated with the execution of the one or more exit controls, and launch the enclave instance if the analysis confirms the identity of the enclave instance, wherein the memory location is to be obtained from the URTS.

8. The apparatus of claim 7, wherein the identity manager is to track a plurality of launch instructions associated with the enclave instance based on one or more annotations to the plurality of launch instructions and remove the one or more annotations from the plurality of launch instructions.

9. The apparatus of claim 7, wherein the identity manager is to track a plurality of launch instructions associated with the enclave instance based on a tracking data structure.

10. The apparatus of claim 6, wherein the identity manager is to invoke a trusted enclave launcher and launch the enclave instance via the trusted enclave launcher, and wherein the memory location is to be obtained from the trusted enclave launcher.

11. A method comprising:

verifying, from outside a trusted computing base of an enclave instance, an identity of the enclave instance prior to the enclave instance being launched in the trusted computing base, wherein the enclave instance is a proxy enclave instance;

determining a memory location of the enclave instance;

confirming that the memory location is local to the computing system; and communicating data generated outside the trusted computing base to one or more additional enclave instances in the trusted computing base via the proxy enclave instance and an unencrypted channel, wherein the unencrypted channel includes non-EPC buffer memory that receives the data from a data transfer component and that provides the data to the proxy enclave instance that communicates the data to the one or more additional enclave instances.

12. The method of claim 11, further including:

enabling one or more exit controls in a virtual machine;

triggering an execution of the one or more exit controls via an untrusted runtime system (URTS) associated with the virtual machine;

conducting an analysis of one or more parameters associated with the execution of the one or more exit controls; and launching the enclave instance if the analysis confirms the identity of the enclave instance, wherein the memory location is obtained from the URTS.

13. The method of claim 12, further including:

tracking a plurality of launch instructions associated with the enclave instance based on one or more annotations to the plurality of launch instructions; and removing the one or more annotations from the plurality of launch instructions.

14. The method of claim 12, further including tracking a plurality of launch instructions associated with the enclave instance based on a tracking data structure.

15. The method of claim 11, further including:

invoking a trusted enclave launcher; and launching the enclave instance via the trusted enclave launcher, wherein the memory location is obtained from the trusted enclave launcher.

16. At least one non-transitory computer readable storage medium comprising a set of instructions, which when executed by a computing system, cause the computing system to:

verify, from outside a trusted computing base of an enclave instance, an identity of the enclave instance prior to the enclave instance being launched in the trusted computing base, wherein the enclave instance is a proxy enclave instance;

determine a memory location of the enclave instance;

confirm that the memory location is local to the computing system; and communicate data generated outside the trusted computing base to one or more additional enclave instances in the trusted computing base via the proxy enclave instance and an unencrypted channel, wherein the unencrypted channel includes non-EPC buffer memory that is to receive the data from a data transfer component and that is to provide the data to the proxy enclave instance that is to communicate the data to the one or more additional enclave instances.

17. The at least one computer readable storage medium of claim 16, wherein the instructions, when executed, cause the computing system to:

enable one or more exit controls in a virtual machine;

trigger an execution of the one or more exit controls via an untrusted runtime system (URTS) associated with the virtual machine;

conduct an analysis of one or more parameters associated with the execution of the one or more exit controls; and launch the enclave instance if the analysis confirms the identity of the enclave instance, wherein the memory location is to be obtained from the URTS.

18. The at least one computer readable storage medium of claim 17, wherein the instructions, when executed, cause the computing system to:

track a plurality of launch instructions associated with the enclave instance based on one or more annotations to the plurality of launch instructions; and remove the one or more annotations from the plurality of launch instructions.

19. The at least one computer readable storage medium of claim 17, wherein the instructions, when executed, cause the computing system to track a plurality of launch instructions associated with the enclave instance based on a tracking data structure.

20. The at least one computer readable storage medium of claim 16, wherein the instructions, when executed, cause the computing system to:

invoke a trusted enclave launcher; and launch the enclave instance via the trusted enclave launcher, wherein the memory location is to be obtained from the trusted enclave launcher.

* * * * *